United States Patent
Seon et al.

(10) Patent No.: US 9,617,905 B2
(45) Date of Patent: Apr. 11, 2017

(54) APPARATUS FOR EXHAUST HEAT RECOVERY WITH EMBEDDED VALVE ACTUATOR

(71) Applicants: Hyundai Motor Company, Seoul (KR); Kia Motors Corporation, Seoul (KR); Sejong Ind. Co., Ltd., Ulsan-shi (KR)

(72) Inventors: Jong-Ho Seon, Inchun-shi (KR); Ho-Chan An, Hwasung-shi (KR); Jae-Yeon Kim, Hwasung-shi (KR); Tae-Yeong Byoen, Ulsan-shi (KR); Gyu-Jun Kim, Ulsan-shi (KR); Jin-Yong Kim, Ulsan-shi (KR)

(73) Assignees: Hyundai Motor Company, Seoul (KR); Kia Motors Corporation, Seoul (KR); Sejong Ind. Co., Ltd., Ulsan-shi (KR)

( * ) Notice: Subject to any disclaimer, the term of this patent is extended or adjusted under 35 U.S.C. 154(b) by 332 days.

(21) Appl. No.: 14/539,576

(22) Filed: Nov. 12, 2014

(65) Prior Publication Data
US 2015/0129173 A1    May 14, 2015

(30) Foreign Application Priority Data
Nov. 14, 2013 (KR) .................. 10-2013-0138024

(51) Int. Cl.
G05D 23/00    (2006.01)
G05D 15/00    (2006.01)
(Continued)

(52) U.S. Cl.
CPC ............... *F01P 3/00* (2013.01); *F01N 5/02* (2013.01); *F02G 5/02* (2013.01); *F28D 9/0043* (2013.01);
(Continued)

(58) Field of Classification Search
CPC .... F01N 5/02; F01N 2240/02; F01N 2240/20; F01N 2240/36; F01N 2250/06;
(Continued)

(56) References Cited

U.S. PATENT DOCUMENTS 1,870,809 A * 8/1932 Handy .................. F01M 1/12
                                                  165/297
2,103,947 A * 12/1937 Holmes ............... F02M 15/02
                                                  123/552
(Continued)

FOREIGN PATENT DOCUMENTS

JP    2009-209913 A    9/2009
JP    2009209913 A *   9/2009
(Continued)

*Primary Examiner* — Justin Jonaitis
(74) *Attorney, Agent, or Firm* — Morgan, Lewis & Bockius LLP

(57) ABSTRACT

An exhaust heat recovery apparatus may include a bypass valve that is rotatably provided on a bypass path through which a high-temperature exhaust gas passes to open or close the bypass path, a heat exchanger that is communicatively connected to the bypass path to allow heat exchange to be performed between the high-temperature exhaust gas supplied from the bypass path and a low-temperature coolant introduced through a coolant inlet when the bypass path is closed, a valve actuator including a rod moved up and down by expansion or contraction of a wax sealed therein, and a connection part that converts an up and down motion of the rod into a rotary motion to allow the bypass valve to open or close the bypass path along with movement of the rod.

8 Claims, 7 Drawing Sheets

(51) Int. Cl.
| | |
|---|---|
| G05D 16/00 | (2006.01) |
| F01P 3/00 | (2006.01) |
| F02G 5/02 | (2006.01) |
| F01N 5/02 | (2006.01) |
| F28F 27/02 | (2006.01) |
| F28D 9/00 | (2006.01) |
| F28D 21/00 | (2006.01) |

(52) U.S. Cl.
CPC .......... *F28D 21/0003* (2013.01); *F28F 27/02* (2013.01); *F01N 2240/02* (2013.01); *F01N 2240/20* (2013.01); *F01N 2240/36* (2013.01); *F28F 2250/06* (2013.01); *Y02T 10/16* (2013.01); *Y02T 10/166* (2013.01)

(58) Field of Classification Search
CPC .............. F01N 13/087; F01N 2410/00; F01N 2410/02; F01N 2410/03; F01N 2410/04; F01N 2410/06; F01N 2410/08; F01N 2410/10; F01N 2410/12; F01N 2410/14; F01N 2250/10; F01N 2250/12; F01N 3/0878; F01N 3/2053; F01N 3/30; F01N 3/0233; F01N 3/2093; F01N 3/22; F01N 3/222; F01N 3/225; F01N 13/004; F01N 2240/04; F01N 2240/10; F01N 2240/12; F01N 2240/16; F01N 2260/00; F01N 2260/02; F01N 2260/002; F01N 2260/024; F01N 3/02; F01N 3/0205; F01N 3/0234; F01N 3/2006; F01N 3/2013; F01N 3/202; F01N 3/2026; F01N 3/2033; F01N 3/204; F01N 3/2046; F01N 3/2889; F01N 5/00; F01P 3/00; F28D 9/0043; F28D 21/0003; F28F 27/02; Y02T 10/16; Y02T 10/166; F02G 5/02
USPC .............. 165/297, 283, DIG. 110, DIG. 109, 165/DIG. 122; 60/287, 288, 320
See application file for complete search history.

(56) References Cited

U.S. PATENT DOCUMENTS

| | | | | |
|---|---|---|---|---|
| 2009/0049832 | A1* | 2/2009 | Hase | F01N 5/02 60/320 |
| 2012/0144814 | A1* | 6/2012 | Won | F01M 5/001 60/320 |
| 2013/0133875 | A1* | 5/2013 | Kim | F28F 27/02 165/296 |
| 2013/0140017 | A1* | 6/2013 | Kim | F28F 27/02 165/299 |
| 2013/0327287 | A1* | 12/2013 | Kim | F01P 7/16 123/41.33 |
| 2015/0167519 | A1* | 6/2015 | Gerges | F01N 5/02 165/104.19 |

FOREIGN PATENT DOCUMENTS

| | | |
|---|---|---|
| JP | 2011-231714 A | 11/2011 |
| JP | 2012-246870 A | 12/2012 |

* cited by examiner

→ EXHAUST-GAS FLOWING PATH
----→ COOLANT FLOWING PATH

APPARATUS FOR EXHAUST HEAT RECOVERY WITH EMBEDDED VALVE ACTUATOR

CROSS-REFERENCE TO RELATED APPLICATION

The present application claims priority to Korean Patent Application No. 10-2013-138024, filed Nov. 14, 2013, the entire contents of which is incorporated herein for all purposes by this reference.

BACKGROUND OF THE INVENTION

1. Field of the Invention

The present invention relates to an exhaust heat recovery apparatus with an embedded valve actuator manufactured by inserting a valve actuator into an exhaust heat recovery apparatus, and more particularly, to an exhaust heat recovery apparatus with an embedded valve actuator which includes a valve actuator that is inserted into a heat exchanger to vertically penetrate the heat exchanger and includes a wax sealed therein, and a connection part that connects the valve actuator and a rotational shaft of a bypass valve to allow the bypass valve to open or close the bypass path along with an up and down motion of a rod of the valve actuator.

2. Description of Related Art

In general, a vehicle performs a warm-up step and a heating step in an early stage of starting, a thermoelectric generating step during the running of the vehicle, and a bypass step when the vehicle runs on an inclined road or runs at an excessively speed, depending on a running state.

An exhaust heat recovery apparatus of the vehicle is an apparatus that recovers exhaust heat discarded after engine combustion to use the recovered exhaust heat for a warm-up of the engine and a warm-up of a transmission, or transmits recovered heat energy to an air conditioning device to use the transmitted heat energy to heat the inside of the vehicle.

When the exhaust heat recovery apparatus of the vehicle is used, a coolant can be heated using a high-temperature exhaust gas in an early stage of starting. Thus, a pre-heating time of the engine is reduced, so that it is possible to improve fuel efficiency and to reduce the exhaust gas.

The largest amount of contaminants is discharged from the vehicle at the time of idling before the engine is warmed up, and it is possible to reduce contaminants discharged from the vehicle by using the exhaust heat recovery apparatus to reduce the warm-up time.

It is also possible to reduce friction within the engine and friction within the transmission by rapidly increasing temperatures of an engine coolant and transmission oil by using the coolant heated through the exhaust heat recovery apparatus. Furthermore, it is possible to rapidly heat the inside of the vehicle in the winter time.

As illustrated in FIG. 1, an exhaust heat recovery apparatus according to the related art generally has a structure in which a separate valve actuator 4 is provided outside a bypass path 2 opened or closed by a bypass valve 1 and a heat exchanger 3 to rotate the bypass valve 1.

However, in the exhaust heat recovery apparatus according to the related art in which the valve actuator is disposed outside the heat exchanger, a structure thereof may be complicated, and a space where the exhaust heat recovery apparatus occupies may become large to relatively reduce a space where other components are disposed.

Even when the valve actuator is inserted into the heat exchanger in order to solve the above-stated problem, a structure in which the bypass valve is rotated by the valve actuator may be complicated, manufacturing cost and weight may be increased, and a manufacturing process may be complicated.

When the valve actuator is inserted into the heat exchanger, the valve actuator may be thermally damaged by the heat exchanger heated by a high-temperature exhaust gas, so that operation reliability of the valve actuator may be degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust heat recovery apparatus with an embedded valve actuator with which it is possible to reduce manufacturing cost and weight by miniaturizing the exhaust heat recovery apparatus and it is possible to improve operation reliability of the valve actuator by including a heat blocking structure around the valve actuator.

According to various aspects of the present invention, an exhaust heat recovery apparatus with an embedded valve actuator may include a bypass valve that is rotatably provided on a bypass path through which a high-temperature exhaust gas passes to open or close the bypass path, a heat exchanger connected to a side of the bypass path, and communicatively connected to the bypass path to allow heat exchange to be performed between the high-temperature exhaust gas supplied from the bypass path and a low-temperature coolant introduced through a coolant inlet when the bypass path is closed, a valve actuator inserted into an insertion opening formed to vertically penetrate through the heat exchanger, and including a rod moved up and down by expansion or contraction of a wax sealed therein along with a temperature of the coolant, and a connection part having one end connected to an upper end of the rod of the valve actuator and another end connected to a rotational shaft of the bypass valve, and that converts an up and down motion of the rod into a rotary motion to allow the bypass valve to open or close the bypass path along with movement of the rod.

The connection part may include a slit that is connected to an upper end of the rod of the valve actuator and is formed to penetrate in a forward and backward direction of a vehicle, a first link with one end vertically connected to be fixed to the rotational shaft horizontally disposed at a top of the bypass valve, and a second link with one end horizontally connected to another end of the first link and another end of the second link slidably accommodated in the slit.

When the slit connected to the upper end of the rod is moved up and down, the second link may be moved back and forth to rotate the first link, and the bypass valve may be rotated to open or close the bypass path.

When a temperature of the coolant passing through the heat exchanger is relatively lower than an expansion temperature of the wax within the valve actuator, the rod may be lowered along with the contraction of the wax to move the second link rearward within the slit, the first link may be rotated in a clockwise direction to allow the bypass valve to close the bypass path, and the high-temperature exhaust gas may be introduced toward the heat exchanger.

When a temperature of the coolant passing through the heat exchanger is relatively higher than an expansion temperature of the wax within the valve actuator, the rod may be raised along with the expansion of the wax to move the second link forward within the slit, the first link may be rotated in a counterclockwise direction to allow the bypass valve to open the bypass path, and the high-temperature exhaust gas may be bypassed toward the bypass path.

The heat exchanger may be disposed in such a manner that plate-shaped coolant paths through which the coolant introduced through the coolant inlet flows and plate-shaped exhaust paths through which the exhaust gas flows are alternately laminated to be adjacent to each other in parallel.

The exhaust heat recovery apparatus may further include a plurality of coolant penetrating holes that are vertically disposed adjacent to the insertion opening of the heat exchanger, and are formed to penetrate through the coolant paths to allow the coolant to flow. The valve actuator may be prevented from being thermally damaged by the heated heat exchanger by the low-temperature coolant flowing through the coolant penetrating holes.

The exhaust heat recovery apparatus may further include a plurality of ring-shaped air tubes that are connected along a circumference of an outer circumferential surface of the insertion opening and are filled with air therein. The valve actuator may be prevented from being thermally damaged by the heated heat exchanger by the air within the air tubes.

The exhaust heat recovery apparatus may further include a plurality of heat-insulting materials that are connected to an outer circumferential surface of the valve actuator bonded to the heat exchanger, the valve actuator may be prevented from being thermally damaged from the heated heat exchanger by the high-temperature exhaust gas According to various embodiments of the present invention, it is possible to reduce manufacturing cost and weight by miniaturizing the exhaust heat recovery apparatus, and since a space around the exhaust heat recovery apparatus becomes large, it is possible to increase a degree of package freedom around the exhaust heat recovery apparatus.

Since the connection part connecting the valve actuator and the rotational shaft of the bypass valve has a relatively simple configuration including the slit, the first link and the second link, it is possible to simplify an assembly process, and it is possible to reduce the number of assembly processes and an assembly time.

It is also possible to prevent the valve actuator from being thermally damaged by the heat exchanger heated by the high-temperature exhaust gas by including a heat blocking structure including the plurality of coolant penetrating holes, the plurality of air tubes or the plurality of heat-insulating materials around the valve actuator. As a result, it is possible to improve durability of the valve actuator and to increase operation reliability of the valve actuator.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
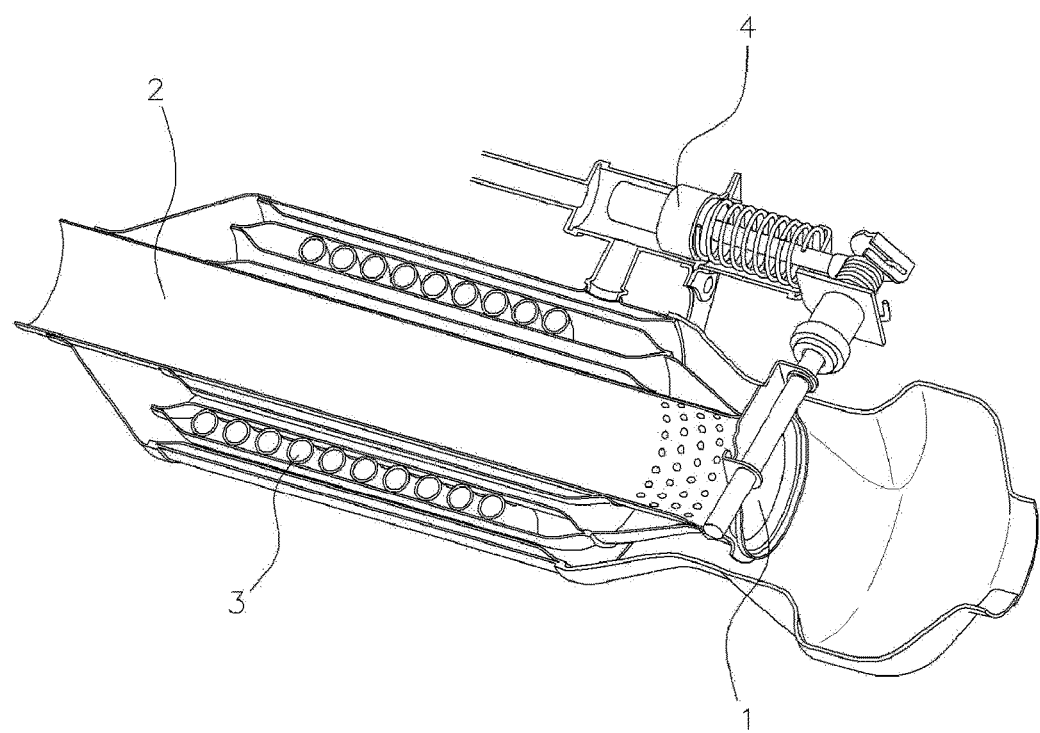
FIG. 1 is a partially cutaway perspective view of an exhaust heat recovery apparatus in which a valve actuator is disposed outside a heat exchanger according to the related art.

In the figures, reference numbers refer to the same or equivalent parts of the present invention throughout the several figures of the drawing.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exhaust heat recovery apparatus with an embedded valve actuator according to an exemplary embodiment of the present invention includes a bypass valve 11 that is rotatably provided on a bypass path 10 through which a high-temperature exhaust gas passes to open or close the bypass path 10, a heat exchanger 20 that is connected to a side of the bypass path 10 and is communicatively connected to the bypass path 10 to allow heat exchange to be performed between the high-temperature exhaust gas supplied from the bypass path 10 and a low-temperature coolant introduced through a coolant inlet 26 when the bypass path 10 is closed, a valve actuator 30 that is inserted into an insertion opening 21 vertically formed to penetrate through the heat exchanger 20 and includes a rod 34 moved up and down by expansion or contraction of a wax 32 sealed therein along with a temperature of the coolant, and a connection part 40 with one end connected to an upper end of the rod 34 of the valve actuator 30 and the other end connected to a rotational shaft 12 of the bypass valve and that converts an up and down motion of the rod 34 into a rotary motion to allow the bypass valve 11 to open or close the bypass path 10 along with movement of the rod 34.

Figure 2:
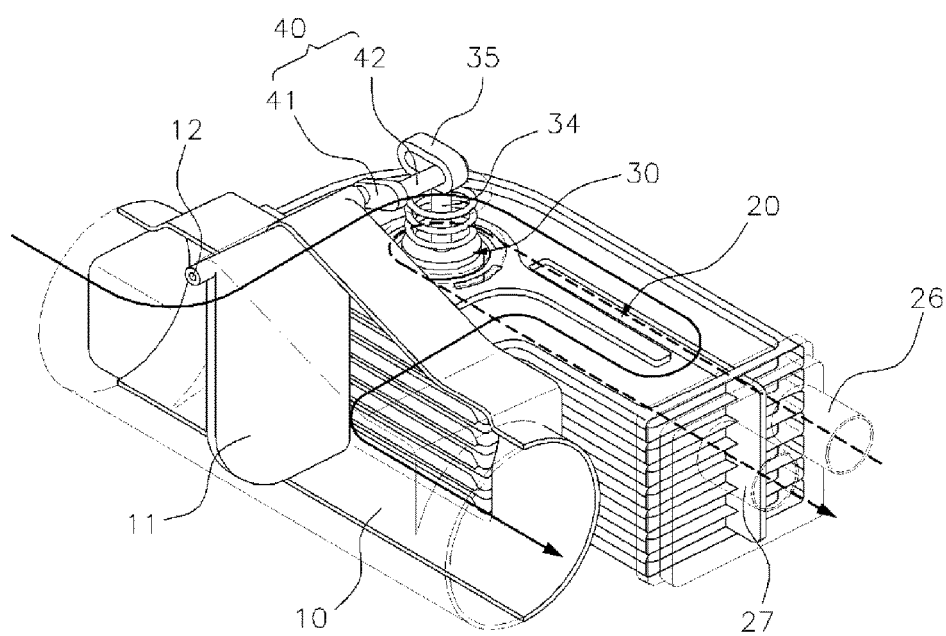
FIG. 2 is a projection perspective view illustrating a state where a bypass path is closed in an exemplary exhaust heat recovery apparatus with an embedded valve actuator according to the present invention.
Figure 3:
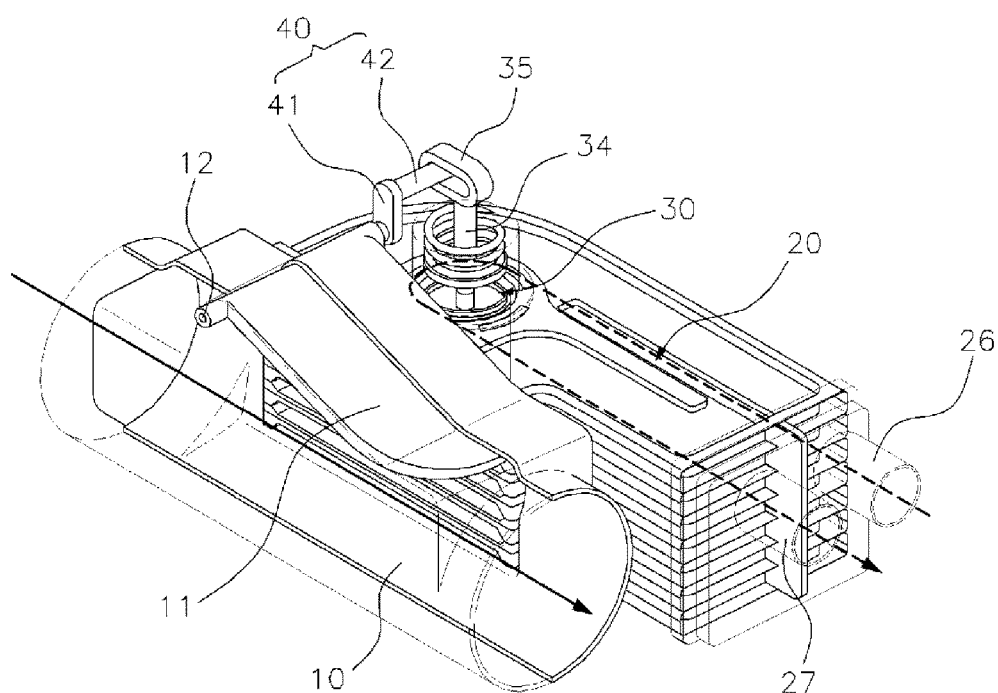
FIG. 3 is a projection perspective view illustrating a state where the bypass path is opened in the exemplary exhaust heat recovery apparatus with an embedded valve actuator according to the present invention.

As illustrated in FIG. 2, the bypass path 10 is formed in a pipe shape into which the high-temperature exhaust gas passes. Additionally bypass path 10 may be formed into any other shape depending on various factors. According to various embodiments, an inlet of the bypass path into which the exhaust gas is introduced and an outlet thereof from which the exhaust gas is discharged have circular cross sections, and a cross section between the inlet and the outlet has a rectangular cylinder shape. Additionally these shapes may be varied depending on various factors. As illustrated in FIG. 3, a protruding structure having an inclined angle to accommodate the bypass valve 11 is formed at an upper end of the bypass path 10.

The bypass path 10 may naturally have various shapes such as a hexagonal cylinder shape and an elliptical cylinder shape in consideration of a kind of a vehicle, the amount of discharged exhaust gas and the entire external appearance of a vehicle body.

As illustrated in FIGS. 2 and 3, the bypass valve 11 having the same plate shape as the cross section of the bypass path 10 is rotatably provided on the bypass path 10 to open or close the bypass path 10.

As illustrated in FIGS. 2 and 3, the bypass valve 11 is rotated around the rotational shaft 12 horizontally formed at a top thereof in a clockwise direction to close the bypass path 10, or is rotated in a counterclockwise direction to open the bypass path 10.

However, the rotation direction of the bypass valve 11 may be changed depending on a position of the rotational shaft 12 and an arrangement relation between the bypass valve 11 and the rotational shaft 12. When the bypass path 10 is connected to the heat exchanger 20 to be described below in a direction opposite to the direction in an illustrated embodiment, the bypass valve 11 is rotated in a direction opposite to the aforementioned rotation direction to open or close the bypass path 10.

As illustrated in FIG. 2, when the bypass path 10 is closed, the heat exchanger 20, which allows heat exchange to be performed between the high-temperature exhaust gas supplied from the bypass path 10 and a low-temperature coolant that is introduced through the coolant inlet 26 and is discharged through a coolant discharge port 27, is attached to the side of the bypass path 10.

As illustrated in FIG. 2, the high-temperature exhaust gas and the low-temperature coolant passing within the heat exchanger 20 flow in an opposite direction to each other, and the coolant heated during the flowing is discharged through the coolant discharge port 27 to warm up a transmission and an engine.

As illustrated in FIG. 3, when the coolant is sufficiently heated through the heat exchanger 20, in order to prevent an excess thermal load, the bypass valve 11 is rotated through the connection part 40 to be described below to open the bypass path 10, and the exhaust gas is mostly discharged through the bypass path 10.

As illustrated in FIG. 2, the valve actuator 30 with a sealed wax (see reference numeral 32 in FIG. 5) is inserted into one side of the heat exchanger 20 to vertically penetrate the heat exchanger 20.

Figure 5:
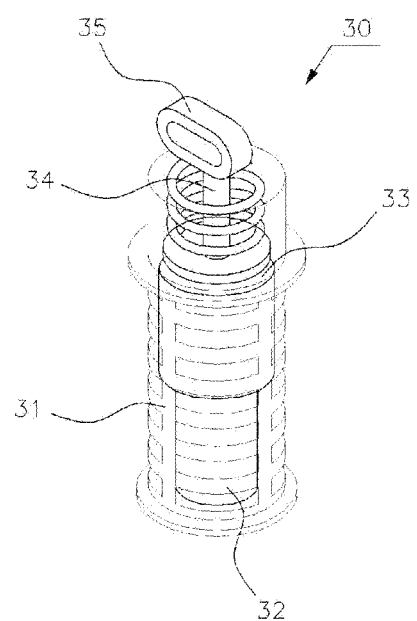
FIG. 5 is a projection perspective view of the valve actuator in the exemplary exhaust heat recovery apparatus according to the present invention.

As illustrated in FIG. 5, specifically, the valve actuator 30 includes a cylindrical housing 31 having a top opening, the wax 32 filled within the housing 31, a piston 33 that is accommodated within the housing 31 to be slid up and down and is formed to completely seal the opening of the housing 31, and the rod 34 with one end connected to the piston 33 to be moved up and down along with movement of the piston 33.

The valve actuator 30 is operated in such a manner that when a temperature of the coolant flowing around the housing 31 of the valve actuator 30 is higher than an expansion temperature of the wax 32 within the housing 31, the piston 33 is pushed upward by expansion of the wax 32 to move the rod 34 upward and when the temperature of the coolant flowing around the housing 31 is lower than the expansion temperature of the wax 32 within the housing 31, the piston 33 is moved downward by the contraction of the wax 32 to move the rod 34 downward.

As illustrated in FIG. 2, the connection part 40 that converts an up and down motion of the rod 34 into a rotary motion to rotate the bypass valve 11 along with movement of the rod 34, is provided between the valve actuator 30 and the rotational shaft 12 of the bypass valve.

Examples of the connection part 40 may include a mechanical element using a pinion gear, a rack gear, and a cam that converts a circular motion into a reciprocating motion or a swing motion or converts the reciprocating motion or the swing motion into the circular motion, and a link structure that converts the reciprocating motion into the rotary motion by using a plurality of links.

Examples of the cam used for the connection part 40 may include a plate cam in which an end of arm comes in contact with a groove of a cone having an inclined angle and thus the cone is rotated to move the arm along the groove up and down as in a typical cam, and a spherical cam in which an end of an arm comes in contact with a groove formed in a surface of a sphere and thus the sphere is rotated to move the arm up and down.

The cam may be of a type in which the end of the arm comes in contact with the groove along with the up and down motion of the arm to rotate the cone or sphere. The connection part 40 according to exemplary embodiments of the present invention may mostly use the cam of the aforementioned type.

As illustrated in FIG. 2, the connection part 40 according to the present invention may include a slit 35 formed at the upper end of the rod 34 in a forward and backward direction, a first link 41 with one end vertically connected to be fixed to the rotational shaft 12 horizontally disposed at a top of the bypass valve 11, and a second link 42 with one end horizontally connected to the other end of the first link 41 and the other end slidably accommodated in the slit 35.

That is, the rotational shaft 12 of the bypass valve 11 and the second link 42 are disposed to be deviated from each other in parallel with the first link 41 interposed therebetween to be respectively connected to opposite sides of the first link 41, and the first link 41 is vertically disposed between the rotational shaft 12 of the bypass valve 11 and the second link 42 to connect the rotational shaft 12 of the bypass valve 11 and the second link 42.

As illustrated in FIG. 2, when the temperature of the coolant passing through the heat exchanger 20 is relatively lower than the expansion temperature of the wax (see reference numeral 32 in FIG. 5) within the valve actuator 30, the rod 34 is lowered along with the contraction of the wax 32. At this time, the second link 42 is disposed at a rear of the slit 35, and the first link 41 disposed to be perpendicular to the second link 42 is rotated in the clockwise direction along with the movement of the second link 42. The bypass path 10 connected to the first link 41 is also rotated around the rotational shaft 12 in the clockwise direction along with the rotation of the first link 41 to close the bypass path 10.

As illustrated in FIG. 3, when the temperature of the coolant passing through the heat exchanger 20 is relatively higher than the expansion temperature of the wax 32) within the valve actuator 30, the rod 34 is raised along with the expansion of the wax 32. At this time, the second link 42 is disposed in front of the slit 35, and the first link 41 disposed to be perpendicular to the second link 42 along with the movement of the second link 42 is rotated in the counterclockwise direction. The bypass valve 11 connected to first link 41 is also rotated around the rotational shaft 12 along with the rotation of the first link 41 in the counterclockwise direction to open the bypass path 10.

The movement direction of the second link 42 and the rotation direction of the first link 41 may be opposite to the aforementioned movement direction and rotation direction depending on an arrangement relation between the rotational shaft 12 of the bypass valve 11 and the rod 34 of the valve actuator, and an arrangement relation between the bypass path 10 and the heat exchanger 20.

As stated above, the connection part 40 connecting the valve actuator 30 and the rotational shaft 12 of the bypass valve 11 has a relatively simple configuration including the slit 35, the first link 41 and the second link 42. Accordingly, the assembly process of the exhaust heat recovery apparatus can be simplified, the number of assembly processes can be decreased, and an assembly time can be reduced.

Figure 4:
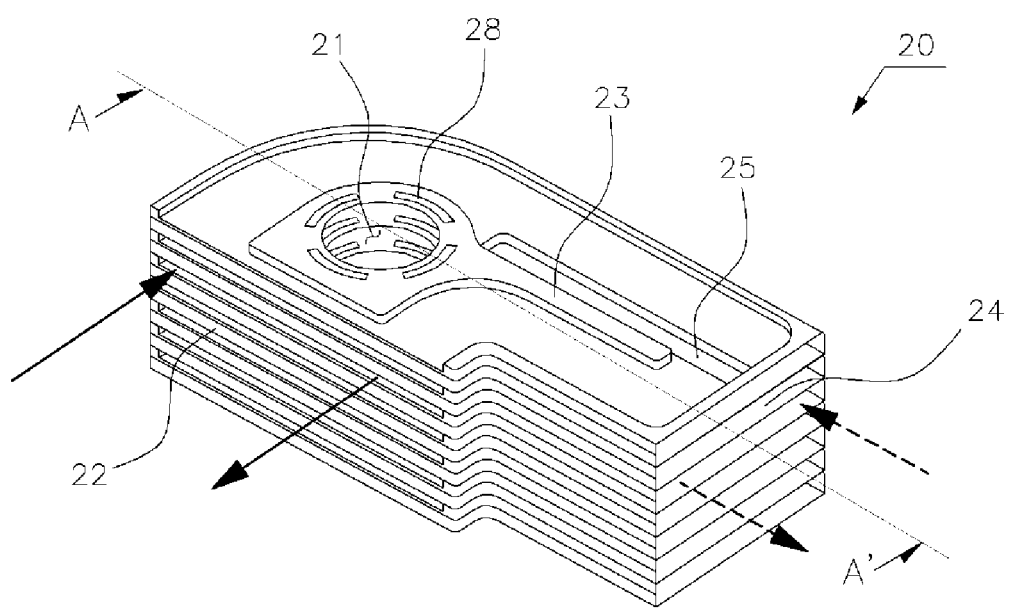
FIG. 4 is a perspective view of a heat exchanger in the exemplary exhaust heat recovery apparatus with an embedded valve actuator according to the present invention.
Figure 4:

As illustrated in FIGS. 2 and 4, the heat exchanger 20 may be a plate-shaped heat exchanger 20 in which plate-shaped coolant paths 24 through which the coolant introduced through the coolant inlet 26 flows and plate-shaped exhaust gas paths 22 communicatively connected to the bypass path 10 to allow the introduced exhaust gas to flow are alternately laminated to be adjacent to each other in parallel.

As illustrated in FIGS. 2 and 4, it is preferred that a coolant partition 25 and an exhaust gas partition 23 vertically passing through the coolant path 24 and the exhaust gas path 22 are provided at the coolant paths 24 and the exhaust gas paths 22 to allow the coolant and the exhaust gas to flow in the entire heat exchanger 20.

Since the coolant paths 24 and the exhaust gas paths 22 are alternately disposed to be adjacent to each other and are formed to allow the coolant and the exhaust gas to flow in the opposite direction to each other, it is possible to maximize heat exchange performance of the heat exchanger 20.

Figure 6:
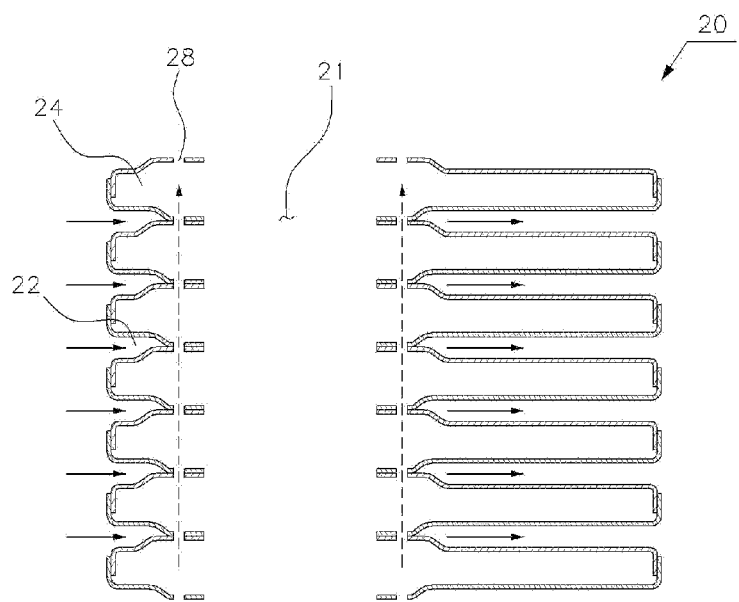
FIG. 6 is a cross-sectional view taken along line A-A' of FIG. 4 for showing a state where coolant penetrating holes are formed in the heat exchanger in the exemplary exhaust heat recovery apparatus with an embedded valve actuator according to the present invention.

As illustrated in FIGS. 4 and 6, a plurality of coolant penetrating holes 28 vertically penetrating through the coolant paths 24 to allow the coolant to flow may be formed around the insertion opening of the heat exchanger 20.

In various embodiments, four coolant penetrating holes 28 are radially formed around the insertion opening 21, and have arc shapes to correspond to a circumference of the insertion opening 21.

As mentioned above, since the coolant penetrating holes 28 are formed adjacent to the insertion opening 21, the valve actuator 30 does not directly come in contact with the heat exchanger 20 heated by the high-temperature exhaust gas, so that it is possible to prevent the valve actuator 30 from being thermally damaged.

Figure 7:
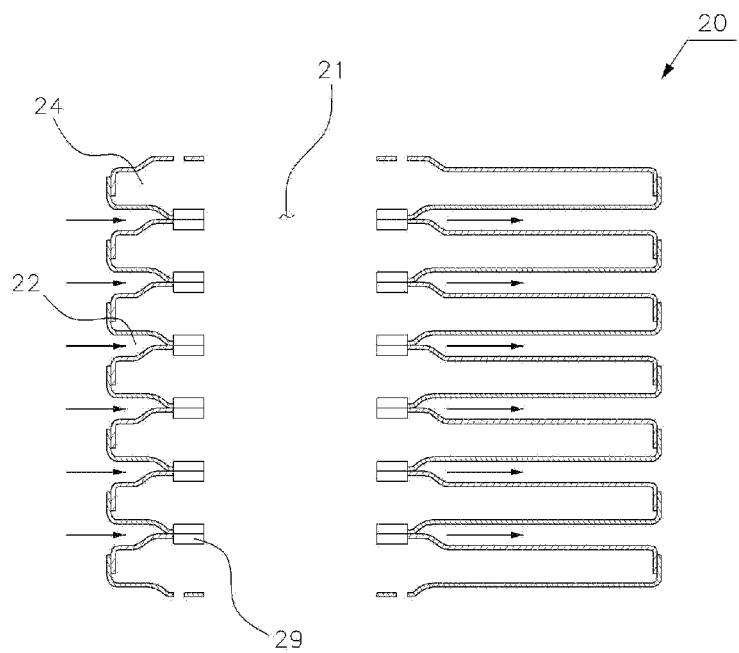
FIG. 7 is a cross-sectional view illustrating a state where air tubes are connected to a heat exchanger in the exemplary exhaust heat recovery apparatus with an embedded valve actuator according to the present invention.

As illustrated in FIG. 7, a plurality of ring-shaped air tubes 29 connected along the circumference may be provided on an outer circumferential surface of the insertion opening 21 and thus the valve actuator 30 does not directly come in contact with the heated heat exchanger 20.

Figure 8:
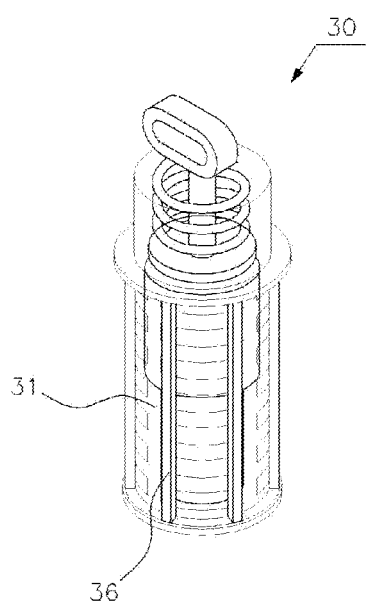
FIG. 8 is a projection perspective view illustrating a state where heat-insulating materials are connected to a valve actuator in the exemplary exhaust heat recovery apparatus with an embedded valve actuator according to the present invention.

As illustrated in FIG. 8, a plurality of heat-insulating materials 36 is vertically connected to an outer circumferential surface of the housing 31 of the valve actuator 30, so that the valve actuator 30 can be prevented from being thermally damaged from the heat exchanger 20 heated by the high-temperature exhaust gas.

As stated above, there is provided a heat blocking structure in which the coolant penetrating holes 28 or the air tubes 29 are provided around the insertion opening 21 of the heat exchanger 20 or the plurality of heat-insulating materials 36 is connected to the outer circumferential surface of the housing 31 of the valve actuator 30. Accordingly, it is possible to prevent the valve actuator 30 from being thermally damaged, and it is possible to improve operation reliability of the valve actuator 30.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust heat recovery apparatus with an embedded valve actuator, the apparatus comprising:
   a bypass valve rotatably provided on a bypass path to open or close the bypass path, wherein a high-temperature exhaust gas selectively passes the bypass path according to a rotation of the bypass valve;
   a heat exchanger connected to a side of the bypass path, and communicatively connected to the bypass path to allow heat exchange to be performed between the high-temperature exhaust gas supplied from the bypass path and a low-temperature coolant introduced through a coolant inlet when the bypass path is closed;
   a valve actuator inserted into an insertion opening formed to vertically penetrate through the heat exchanger, and including a rod reciprocated up and down by expansion and contraction of a wax sealed in the valve actuator based on a temperature of the coolant; and
   a connection part having one end connected to an upper end of the rod of the valve actuator and another end connected to a rotational shaft of the bypass valve, and that converts an up and down motion of the rod into a rotary motion to allow the bypass valve to open or close the bypass path along with movement of the rod.

2. The apparatus of claim 1, wherein the connection part includes:
a slit connected to an upper end of the rod of the valve actuator and formed to penetrate in a forward and backward direction of a vehicle;
a first link with one end vertically connected and fixed to the rotational shaft horizontally disposed at a top of the bypass valve; and
a second link with one end horizontally connected to another end of the first link and another end of the second link slidably accommodated in the slit, and
wherein when the slit connected to the upper end of the rod is moved up and down, the second link is moved back and forth to rotate the first link, and the bypass valve is rotated to open or close the bypass path.

3. The apparatus of claim 2, wherein when the temperature of the coolant passing through the heat exchanger is relatively lower than an expansion temperature of the wax within the valve actuator,
the rod is lowered along with the contraction of the wax to move the second link rearward within the slit, the first link is rotated in a clockwise direction to allow the bypass valve to close the bypass path, and the high-temperature exhaust gas is introduced toward the heat exchanger.

4. The apparatus of claim 2, wherein when the temperature of the coolant passing through the heat exchanger is relatively higher than an expansion temperature of the wax within the valve actuator,
the rod is raised along with the expansion of the wax to move the second link forward within the slit, the first link is rotated in a counterclockwise direction to allow the bypass valve to open the bypass path, and the high-temperature exhaust gas is bypassed toward the bypass path.

5. The apparatus of claim 1, wherein the heat exchanger is disposed in such a manner that plate-shaped coolant paths through which the coolant introduced through the coolant inlet flows and plate-shaped exhaust gas paths through which the exhaust gas flows are alternately laminated to be adjacent to each other in parallel.

6. The apparatus of claim 5, further comprising:
a plurality of coolant penetrating holes that are vertically disposed adjacent to the insertion opening of the heat exchanger, and are formed to penetrate through the coolant paths to allow the coolant to flow,
wherein the valve actuator is prevented from being thermally damaged by the heated heat exchanger by the low-temperature coolant flowing through the coolant penetrating holes.

7. The apparatus of claim 1, further comprising:
a plurality of ring-shaped air tubes that are connected along a circumference of an outer circumferential surface of the insertion opening and are filled with air,
wherein the valve actuator is prevented from being thermally damaged by the heated heat exchanger by the air within the air tubes.

8. The apparatus of claim 1, further comprising:
a plurality of heat-insulating materials that are connected to an outer circumferential surface of the valve actuator bonded to the heat exchanger,
wherein the valve actuator is prevented from being thermally damaged by the heat exchanger heated by the high-temperature exhaust gas.

* * * * *